United States Patent Office 3,404,954
Patented Oct. 8, 1968

3,404,954
MANUFACTURE OF PHOSPHORIC ACID
James Henry Elliston Jeffes, London, and Richard Mark Orpen Maunsell, Pyrford, Surrey, England, assignors to Electric Reduction Company of Canada Ltd., Toronto, Ontario, Canada, a corporation of Canada
Filed June 22, 1964, Ser. No. 376,874
Claims priority, application Great Britain, June 28, 1963, 25,805/63; Feb. 26, 1964, 8,060/64
6 Claims. (Cl. 23—165)

ABSTRACT OF THE DISCLOSURE

A process for concentrating wet process phosphoric acid in which liquid dilute phosphoric acid is heated with gaseous combustion products at a sufficiently high temperature to cause distillation of $P_2O_5$, together with gaseous impurities and entrained impure wet process phosphoric acid. The entrained impure wet process phosphoric acid is then separated from the gaseous products containing an aerosol of purified $P_2O_5$ which is recovered and becomes the product concentrate phosphoric acid.

---

This invention relates to the purification and concentration of wet process or other impure phosphoric acid, hereinafter called "WPA."

WPA is produced by the action of an acid, e.g. sulphuric acid, on phosphate ores. As so obtained it consists of an aqueous solution having a concentration of about 30% (concentrations of WPA are referred to in this specification in terms of weight percentages of $P_2O_5$) with appreciable amounts of cationic and anionic impurities such as iron, aluminum, calcium and other metals and sulphate, fluoro-silicate and other anions. Removal of these impurities on a commercial scale has not hitherto been practicable without significant loss of $P_2O_5$.

The WPA used in the manufacture of fertilisers is usually concentrated from its initial strength of 30% to about 50%. The process of concentration is one of removal of water by evaporation carried out for example in a vacuum evaporator or a submerged flame evaporator. In the submerged flame evaporator the products of combustion come into direct contact with the acid after leaving the flame zone. Although this method is the most efficient way of using the available heat, it has not found wide acceptance in industry owing to an intractable difficulty. On coming into contact with the acid, the combustion gases momentarily heat some of the WPA to a sufficiently high temperature to distill a small proportion of the $P_2O_5$ from the solution. This $P_2O_5$ condenses to form an aerosol of aqueous phosphoric acid which passes with the combustion gases and water vapour to the stack. If it is allowed to discharge, the aerosol constitutes a serious nuisance in the locality, but removal of the aerosol is a matter of some difficulty and the quantity of any phosphoric acid that may be recovered is small. The few operators who do use the submerged flame process therefore strive to reduce the formation of the aerosol to a minimum. The main precaution taken is to keep the temperature of the heating gases down by adding a diluent gas, usually excess air. Thus to produce 54% acid the initial temperature of the gases is usually 900° C., that of the main body of liquid being 130° C. By careful design and operation the percentage of $P_2O_5$ which goes into aerosol formation can be kept down to a figure of the order of 0.1–1.0%.

The present invention is a novel departure in the processing of phosphoric acid in that it maximises the proportion of $P_2O_5$ distilled as an aerosol from WPA by contact with combustion gases, the aerosol being separated from the remainder of the distillation products by coalescence to form an acid which is comparatively pure (and at the same time concentrated) and which can be used for many purposes for which only thermal acid has hitherto been suitable.

The invention consists in a method of concentrating and purifying WPA which comprises heating the acid by direct contact with gases issuing immediately from a flame not containing a substantial excess of either comburent, and at least as hot as that obtainable by burning a hydrocarbon gas in the stoichiometric amount of air, whereby a rapidly moving mixture of gas and liquid is produced and evaporation of a substantial proportion not only of the water but also of the $P_2O_5$, which may be wholly or partly combined with water, is brought about, removing the gas/liquid mixture to a region where the temperature is such that $P_2O_5$ acids condense into the gas phase in the form of an aerosol but is above that at which any volatile impurity in the gas mixture will condense on the aerosol particles, and leading the aerosol, if necessary after separation from entrained impure acid, into a scrubber in which the aerosol particles are caused to coalesce while still being maintained at a temperature above that at which any volatile impurity will condense thereon.

It has been known for a long time, as a matter of academic interest, that a significant proportion of phosphoric oxide will distill from an aqueous solution at temperatures above 300° C., the precise proportion being difficult to predict due to lack of knowledge as to whether the vapour is in the form of $P_4O_{10}$, ortho-phosphoric acid and/or polyphosphoric acid, and to uncertainty about the degree of polymerization of the aqueous acid solution which depends not only on the temperature of the solution but also on the time of exposure to that temperature. Phosphoric acid manufacturers have, however, never entertained the possibility of turning this phenomenon to account for purifying WPA. Their efforts have been directed entirely in the opposite direction of minimising the distillation of $P_2O_5$ and of abating the nuisance arising from such $P_2O_5$ as was distilled. Moreover certain difficulties peculiar to the treatment of WPA arise precisely at those temperatures at which a substantial yield of $P_2O_5$ can be obtained. Of these difficulties the main ones are the attack on all readily available materials of construction, and the formation of salts of polyphosphoric acids which are insoluble in alkalis as well as acids.

In carrying out the invention, apparatus is used such that the hot gases carry the acid along a path of restricted cross-section such as, for example, an annulus or a pipe to a region of extended cross-section where the gas is separated, leaving the liquid to flow back to the point of entry of the gases.

In order to produce a good yield of $P_2O_5$ we have found that it is necessary to use a flame having a temperature at least as great as that obtained by burning a hydrocarbon gas in the stoichiometric quantity of air, i.e. about 1,600° C., and a bulk acid temperature of about 500° C. The yield is substantially greater than would be expected from the published data on vapour pressures of phosphoric oxide at the same bulk acid temperature. This is thought to be due to the fact that at the interface between the gases at their initial temperature and the liquid, evaporation of $P_2O_5$ occurs in non-equilibrium conditions. Moreover some heat is recovered by condensation of the $P_2O_5$ and water to form the aerosol and this is available to evaporate more water.

We have found that even in the presence of acid at a temperature of about 500° C. we can, contrary to expectation, use graphite as the material for the parts of the apparatus in contact with the hot acid. In order to obtain a satisfactory life for apparatus made with this material it is necessary that no appreciable free oxygen shall be present, but this condition is satisfied in the process of the invention since in order to obtain a sufficiently high temperature a stoichiometric combustion mixture is used. However, even in the absence of oxygen, graphite will not last for long if the temperature is too high, for example that of red heat, since it will then react with the phosphoric acid to form phosphorus and carbon monoxide. Such a condition would occur if the gas/liquid flow path were too restricted, with concomitant high gas flow rates, since under these conditions with the relatively viscous acid involved, the burner tip would be gas-blanketed and become red hot.

As mentioned above, the precipitation of intractable salts of polyphosphoric acids and the cations present as impurities in the WPA constitutes a serious problem in processing acid at the temperatures used in this invention. We have found that such precipitation can be reduced to an extent such that it does not interfere with the flow and handling of the residual acid, provided the dwell time of the acid measured as $P_2O_5$ in the hot zone does not exceed a time which depends on the purity of the starting acid but is in any case not greater than about 1 hour. This is surprising at the temperatures and concentrations of acid involved, in view of the published information on the formation of these precipitates. In a continuous process in which the acid is circulated through the hot zone, with fresh acid being introduced and spent acid removed continuously, the dwell time is to be understood as meaning the time during which a particle of acid is on average in contact with the hot gases. The volume of the path over which the gases and liquid travel together divided by the feed rate of $P_2O_5$ per unit time is a measure of the dwell time, although it will be understood that there will be a percentage of gas in the liquid which will reduce the apparent dwell time as thus calculated. The length of the gas/liquid flow path is determined by heat transfer considerations and may be as short as a few inches or as long as several feet, but is preferably about one foot. Thus for a given length of this path, the factors determining dwell time are the cross-sectional area of the path and the feed rate of the acid in terms of $P_2O_5$.

As indicated above, we have found it advantageous to keep the dwell time as low as possible to reduce the formation of insolubles, but the extent to which this can be done for a given feed rate of acid is limited by certain factors. Reducing the dwell time requires reduction of the cross-section of the gas/liquid flow path. The less the cross-sectional area, the greater is the velocity of the incoming combustion gases, but too great a speed of flow reduces the aerosol formation, possibly due to too great a turbulence leading to return of aerosol particles to the liquid. Another result of too great a velocity of the combustion gases is the gas-blanketing of the burner tip mentioned above. Moreover there is a practical limit to the reduction of the cross-sectional area of the flow path if reliable operation free from minor blockages and the like is to be possible. The flow rate of the combustion gases in cubic feet per second divided by the cross-sectional area of the flow path in square feet is a measure of the combustion gas velocity in feet/second. We have found that this ratio, measured at standard temperatures and pressure, should not exceed about 3 ft./sec. to avoid the disadvantages referred to above. The throughput of combustion gases is approximately proportional to the feed rate of acid which, for a given concentration of starting acid, is proportional to the throughput of $P_2O_5$. Thus for a given feed rate there are two conflicting requirements for the cross-sectional area of the flow path: the necessity for a short dwell time requires a small cross-section, and the necessity of avoiding too high a gas velocity requires a large cross-section. We have found that when the starting acid has its minimum concentration of 30%, the maximum dwell time of 1 hour, even with the small scale plant used in the example given below, requires a cross-section which is well above the minimum required by gas flow considerations. In fact the latter corresponds in these conditions with a calculated dwell time of about ½ hour. If the concentration of starting acid is increased, a smaller combustion gas flow rate is required for a given rate of feed, so that the cross-sectional area of the flow path and hence the dwell time can be even less without unduly increasing the gas velocity.

If the scale of the plant is increased, the thermal efficiency is increased and hence the throughput of combustion gases required for a given rate of acid feed is less. Thus in this case also the cross-sectional area of the flow path and hence the dwell time can be less without unduly increasing the gas velocity.

Apparatus for carrying out the invention may consist of a pot containing a downwardly projecting burner tube reaching a point near the bottom of the pot. An annular space if formed between the pot and the tube which is referred to above as the gas/liquid flow path. Above this the internal diameter of the pot is increased to give a space of greatly increased cross-sectional area. Fresh acid is introduced continuously into the pot and spent acid is withdrawn continuously. The combustion gases issue at high velocity and high temperature from the burner tube and this region is highly turbulent. It may be noted that in this region of high temperature where an aerosol is being formed, turbulence is an advantage rather than a disadvantage. The gases are intimately mixed with the liquid and carry it up through the annular space. Degassing occurs at the region of increased cross-section above the annular space. In order to provide the necessary pressure head for the scrubber referred to below, it is preferred to make the apparatus pressure-tight for a pressure of 5–6 p.s.i.g. and introduce the combustion gases at a pressure such as will provide the necessary head.

Since turbulence at the region of the burner tip is an advantage rather than otherwise, a plain cylindrical tube with a constricted high velocity exit port or ports can be used. This prevents ingress of splashed liquid and deposition of solids at the burner tip.

An alternative apparatus for carrying out the invention consists in a U-shaped pipe having the burner tip projecting horizontally into the horizontal limb. The two vertical limbs open into a space of increased cross-sectional area in which separation of the gases takes place.

In contradistinction to the known processes for concentrating WPA which are carried out in stages, we prefer to operate in one stage starting with acid of about 30% strength, as the additional volume of gaseous combustion products which are used in this case per unit of $P_2O_5$ fed increases the proportion of $P_2O_5$ distilled. Theoretically about 3.5 times as much of the $P_2O_5$ fed will be distilled starting with 30% as compared with 54% acid and finishing in both cases with residual acid of 78–80%; in practice the discrepancy is greater for reasons not clearly understood but thought to be due to easier formation of polyacids of low vapour pressure from preconcentrated acid under the conditions of our invention.

The immediate product of the contact between hot gases and acid is a gas phase containing water vapour, $P_2O_5$ acids and volatile impurities, and a liquid phase consisting of concentrated impure aqueous acid. The gas phase is taken to a region at a temperature such that the $P_2O_5$ acids condense as an aerosol which can be separated from any entrained impure acid. The aerosol is then led to a scrubber from which phosphoric acid is obtained which is not only purified, but also concentrated in comparison with the original WPA. If the invention is carried out in the submerged combustion apparatus described above, the $P_2O_5$, water and volatile impurities distill into the bubbles of the combusion products but the temperature of these bubbles is rapidly and drastically reduced as they mix with the liquid, and the $P_2O_5$ acids condense in them to form the aerosol. The gases which eventually separate from the liquid thus contain water vapour, volatile impurities, $P_2O_5$ acid fog and entrained residual acid in liquid form. This mixture is carried to a device such as a cyclone in which the drops of residual acid are separated from gas and acid aerosol. The conditions are controlled so that the temperature of the gas/liquid mixture shortly before separation of the gases is in the range 350° C. to 550° C., preferably 400° C. to 500° C., and the bulk acid concentration is in the range of 75-85%, typically 78-80%.

The aerosol-containing gases from the cyclone are conducted to a scrubber which causes the particles of acid to coalesce. The scrubber may typically consist of a high pressure-drop Venturi into the throat of which is injected some of the purified acid produced by the present process. Alternatively there may be used another type of impingement scrubber such as a packed tower impingement scrubber with co-current downward flow. The scrubber is followed by a second cyclone in which the droplets of acid emerging from the Venturi are separated from the gas stream. The gas freed from droplets of acid may be passed through a cold scrubber of conventional type to remove impurities such as compounds of fluorine, silicon etc. and any residual carry-over of phosphoric acid from the Venturi scrubber. The liquor from the cold scrubber may be added to the residual acid from the distillation apparatus plus that collected from the first cyclone and the whole combined with further raw WPA to produce a concentrated commercial wet acid of approximately 50-60% strength suitable for fertiliser manufacture; alternatively the proportion can be adjusted to produce a wet process polyphosphoric acid of approximately 69-72%.

The temperature in all parts of the apparatus through which the vapours pass after removal of entrained residual acid is maintained above that at which any volatile impurity will condense on the aerosol particles. These impurities will normally consist of compounds of silicon and fluorine and water, and the temperature necessary to prevent condensation will, in a typical case, be about 150-250° C.

The invention can thus be used to make a purified concentrated phosphoric acid suitable for many purposes for which only thermal acid has been useable heretofore, and simultaneously to make as co-product in the same apparatus, a concentrated grade of wet acid in the range 50-72% suitable for fertiliser use. By controlling the conditions, the proportion of purified acid produced can be varied over a wide range up to 70% or more of the $P_2O_5$ initially fed in, depending on requirements and also on the impurity content of the starting acid, the type of fertiliser to be produced, and the production method used to make the fertiliser.

Apparatus for carrying out the invention is illustrated by way of example by the accompanying drawings, in which.

Figure 1:
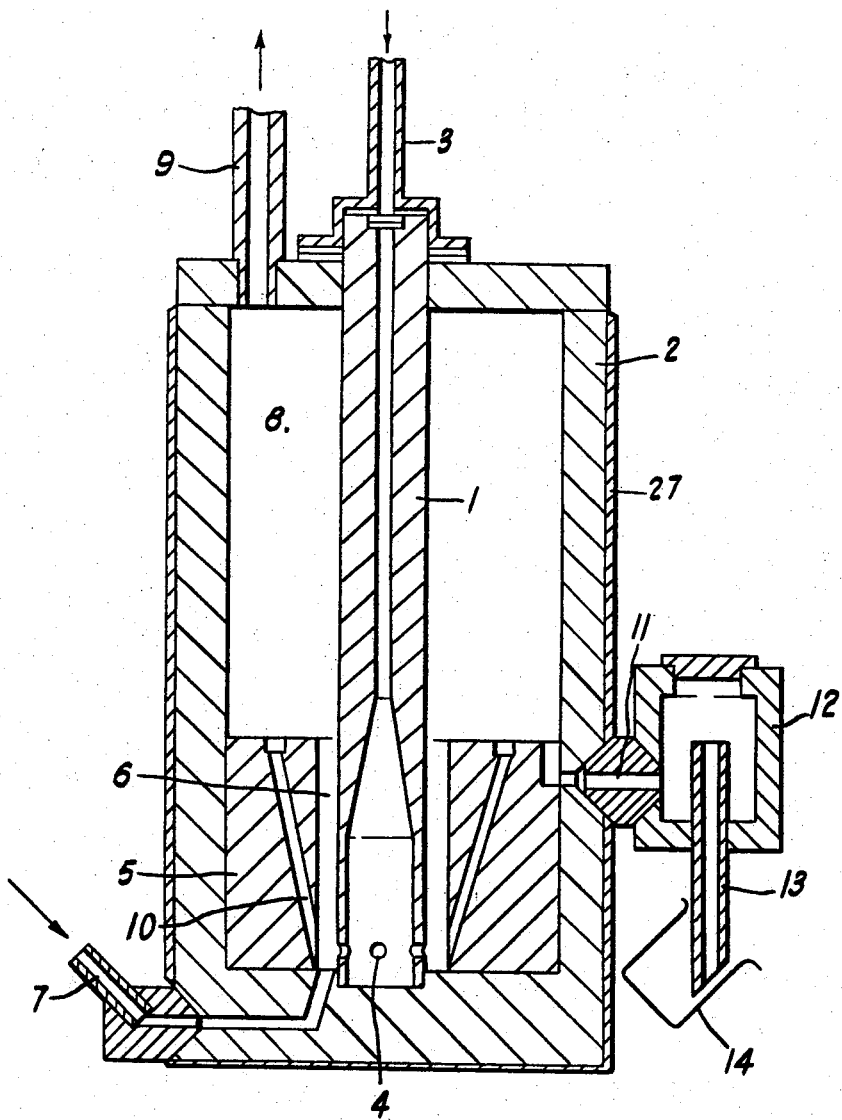
FIG. 1 is a sectional view of the submerged flame evaporator used for distilling off the $P_2O_5$.

Referring to FIG. 1, a burner tube 1 is situated centrally in a pot 2. Fuel and air are fed into the tube through a pipe 3 and combustion takes place at the lower end of the tube. Combustion gases emerge through four holes 4 near the bottom of the tube 1.

A hollow cylindrical insert 5 is fitted into the lower part of the pot 2 to form a cylindrical annular space which as explained below constitutes the gas/liquid flow path 6 of the distillation apparatus. WPA is fed continuously into the bottom of the flow path 6 through a pipe 7. The region around the holes 4 is highly turbulent and an intimate mixture of gases and liquid is formed which travels up the flow path 6. When the mixture reaches the space 8 above the insert 5 degassing occurs and the gases together with the aerosol leave the pot 2 through a pipe 9. The degassed liquid returns to the bottom of the flow path 6 through four channels 10 bored in the insert 5 so that there is a circulation of acid through the region of contact with the combustion gases.

Residual aqueous acid continuously leaves the pot through a pipe 11 leading into vessel 12 containing a pipe 13 which can be raised and lowered to constitute an adjustable weir. The pipe 13 leads to a pressure seal denoted diagrammatically at 14.

All parts of the apparatus shown in FIG. 1 are made of graphite with the exception of the metal shell 28 of the pot 2, and the pipes 3, 7, 9, and 13.

Figure 2:
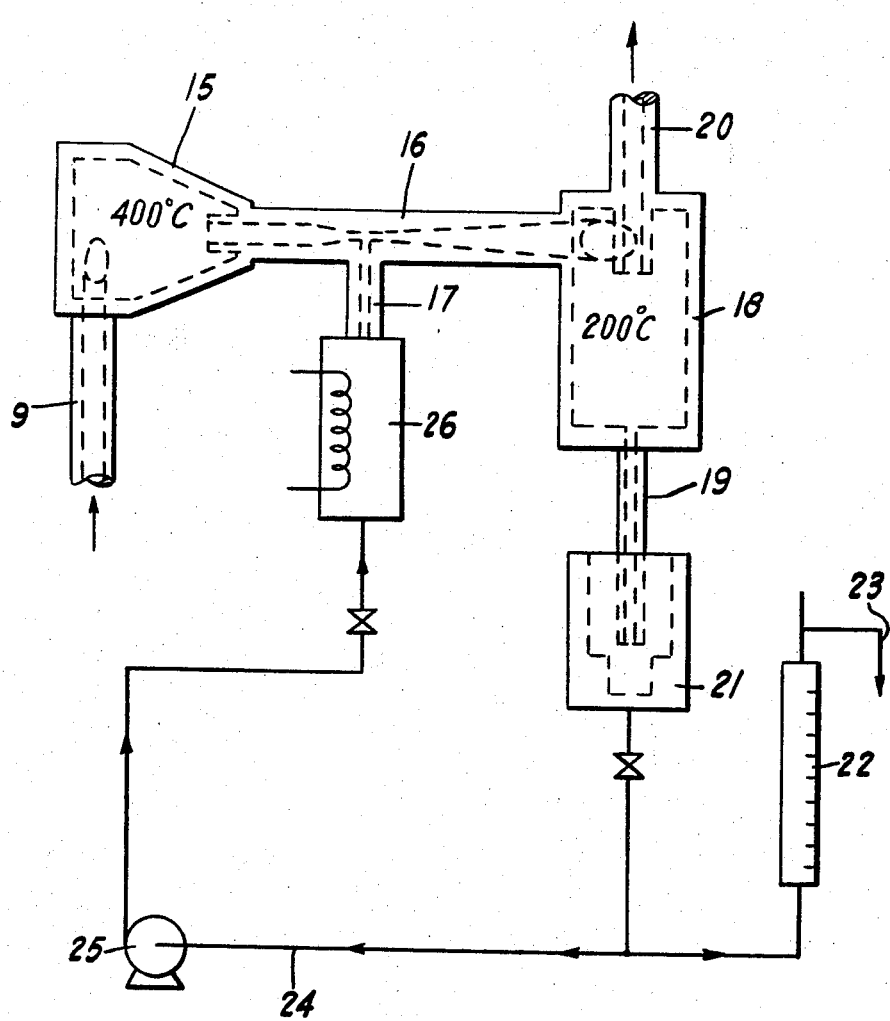
FIG. 2 is a diagrammatic representation of the apparatus for recovering the purified phosphoric acid.

Referring now to FIG. 2, the off gases from the distillation pot (not shown in FIG. 2) flow through pipe 9 to a cyclone 15 for removal of drops of entrained residual acid. These return to the pot 2 through the same pipe 9. The remainder of the material entering the cyclone is an aerosol of phosphoric acid in combustion gases and water vapour. This flows into a scrubber consisting of a Venturi tube 16 into the throat of which is injected some of the product acid through a pipe 17. The action of the Venturi is to cause the aerosol particles to coalesce and form droplets of acid. These are carried in the gas stream to a discharge cyclone 18 and leave as a liquid through a pipe 19. The gases leave the cyclone 18 through a pipe 20 and are passed to the stack, if desired through a cold scrubber of conventional design (not shown) for removing impurities and any residual carry-over of phosphoric acid.

In the apparatus shown in the drawings, the gas flow is maintained by a vacuum of about 5 p.s.i.g. applied through pipe 20, but it will normally be preferred to apply a positive pressure of about the same value to the pot 2 to force the gases through and give them the required velocity in the Venturi 16. In the apparatus as shown, the product acid flows through a barometric seal 21 and 22 and is collected from pipe 23. Some of the acid is diverted through pipe 24 and is pumped by pump 25 by way of a heater 26 and pipe 17 to the throat of the Venturi 16. The purpose of the heater 26 is to provide any make-up heat necessary to maintain the temperature of the Venturi 16 and the cyclone 18 above that at which the most volatile impurity in the gas stream will condense.

In FIG. 2, pipes shown with single lines are made of stainless steel, and parts shown in double continuous and broken lines are made of graphite.

The invention is illustrated by the following example:

The apparatus used was that shown in the drawings, evaporation taking place in an annular cylinder of phosphoric acid at the equilibrium concentration. The inner boundary of this cylinder consisted of the wall of the burner tube 1 and was 4″ in diameter. The outer boundary was the inner boundary of the insert 5 and was 6″ in diameter. The ports 4 were 1 inch in diameter and were at a level about 1 ft. below the top of the insert 5. Most of the liquid entrained by the gases disengaged in the space 8 above the insert. Part of this liquid was returned to the bottom of the flow path 6 via channels 10. The rest flowed out of the pot via pipe 11 and the weir set so as to keep the mean hydrostatic liquid level within the chamber marginally above the top of the insert 5. Fresh acid was fed through pipe 7.

The gases separating from the liquid/gas reaction mixture were led off to the cyclone 15 in which drops of residual acid were separated from the aerosol-containing gas. The latter was fed to the Venturi scrubber 16 into the throat of which was injected some of the purified acid produced as the final product.

The details of the process were as follows:

| | |
|---|---|
| $P_2O_5$ in feed liquid, percent | 28.4 |
| Liquid rate of feed, lbs./hr. | 20 |
| Combustion natural gas, rate of feed, s.c.f.h. | 26 |
| Combustion air, rate of feed, s.c.f.h. | 660 |
| Combustion product gas, rate of flow, dry basis (a), s.c.f.h. | 599 |
| Combustion gas maximum temperature, degrees centigrade | 1,600 |
| Equilibrium temperature in the evaporation chamber, degrees centigrade | 520 |
| Temperature in cyclone 15, degrees centigrade | 400 |

| | |
|---|---|
| Temperature in cyclone 18, degrees centigrade | 200 |
| P₂O₅ in purified acid collected from Venturi scrubber, percent of initial P₂O₅ | 55 |
| Partial pressure of this P₂O₅, were it gas (P₄O₁₀), mms. Hg | 5.4 |
| Residual fertiliser acid: | |
| P₂O₅, percent | 79 |
| Bases, percent | 7 |
| Water, percent | 14 |
| Dwell time, hours | 1 |
| Cross-sectional area of flow path (b), sq. ft. | 109 |
| Ratio of combustion gas flow rate (a) to cross-sectional area (b), ft./sec. (at STP) | 1.52 |

In this small-scale plant thermal losses are high and in a larger scale plant less fuel will be necessary per pound of acid throughput.

What we claim is:

1. A process for concentrating wet process phosphoric acid which comprises
    (a) contacting dilute wet process phosphoric acid feed directly with gaseous combustion products at a temperature sufficient to cause distillation of a substantial proportion of the P₂O₅ to form,
        (i) a gaseous phase composed of combustion products, gaseous impurities, water vapour, and purified P₂O₅ present initially as gaseous P₂O₅ which subsequently condenses in at least partial combination with said water vapour in the form of aerosol particles suspended in said gaseous phase, and
        (ii) entrained impure wet process phosphoric acid droplets;
    (b) separating said entrained impure wet process phosphoric acid droplets from said aerosol-containing gaseous phase at a temperature above about 150° C.;
    (c) coalescing the aerosol particles containing the purified P₂O₅ into liquid droplets at a temperature above about 150° C.; and
    (d) separating said liquid droplets from the gaseous phase at a temperature above about 150° C. to form the purified liquid P₂O₅ product.

2. The process of claim 1 wherein the gaseous products of combustion issue from a flame not containing a substantial excess of either comburent, and at least as hot as that obtainable by burning a hydrocarbon gas in the stoichiometric amount of air, whereby said dilute wet process phosphoric acid is contacted with said gaseous products of combustion to produce a rapidly moving mixture of gas and liquid.

3. The process of claim 2 wherein said dilute wet process phosphoric acid which is being contacted with said gaseous products of combustion is at a temperature between 350° and 550° C.

4. The process of claim 3 wherein said temperature is between 400° C. and 500° C.

5. The process of claim 4 wherein said dilute wet process phosphoric acid is of about 30% strength.

6. The process of claim 5 wherein the temperature at which said aerosol is separated from said gaseous impurities is above 200° C.

References Cited

UNITED STATES PATENTS

| | | | |
|---|---|---|---|
| 2,905,535 | 9/1959 | Atkin et al. | 23—165 |
| 3,044,855 | 7/1962 | Young | 23—165 |
| 3,104,947 | 9/1963 | Switzer et al. | 23—165 |
| 3,316,061 | 4/1967 | Csendes et al. | 23—165 |

EARL C. THOMAS, *Primary Examiner.*

OSCAR R. VERTIZ, *Examiner.*

A. GREIF, *Assistant Examiner.*